US008165704B2

(12) United States Patent
Burda et al.

(10) Patent No.: US 8,165,704 B2
(45) Date of Patent: *Apr. 24, 2012

(54) METHOD OF RELEASE AND PRODUCT FLOW MANAGEMENT FOR A MANUFACTURING FACILITY

(75) Inventors: Richard Gerard Burda, Pleasant Valley, NY (US); Alfred Degbotse, Colchester, VT (US); Brian Trevor Denton, Winooski, VT (US); Kenneth Jeffrey Fordyce, Hurley, NY (US); Robert John Milne, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 45 days.

This patent is subject to a terminal disclaimer.

(21) Appl. No.: 12/349,599

(22) Filed: Jan. 7, 2009

(65) Prior Publication Data

US 2009/0138114 A1    May 28, 2009

Related U.S. Application Data

(63) Continuation of application No. 10/908,420, filed on May 11, 2005, now Pat. No. 7,477,958.

(51) Int. Cl.
 G06F 19/00    (2006.01)
 G01R 31/26    (2006.01)
 G06Q 10/00    (2006.01)
(52) U.S. Cl. .......... 700/102; 700/101; 438/14; 705/7.12
(58) Field of Classification Search .................. 700/100, 700/149, 109, 110, 121, 102, 112; 438/14, 438/15; 705/7.12
See application file for complete search history.

(56) References Cited

U.S. PATENT DOCUMENTS

| 5,164,905 A | * | 11/1992 | Iwasaki et al. ............... 700/112 |
| 5,434,790 A | * | 7/1995 | Saka et al. .................... 700/110 |
| 5,761,064 A | * | 6/1998 | La et al. ....................... 700/110 |

(Continued)

FOREIGN PATENT DOCUMENTS

JP    5108116    4/1993

OTHER PUBLICATIONS

Park et al., An Overall Framework for Generating Simulation-Based Cycle Time-Throughput Curves, Proceedings of the 2001 Winter Simulation Conference, 2001.*

(Continued)

*Primary Examiner* — Albert Decady
*Assistant Examiner* — Darrin Dunn
(74) *Attorney, Agent, or Firm* — Schmeiser, Olsen & Watts; Daniel H. Schnurmann

(57) ABSTRACT

A method and computer program product for scheduling product lots through operations of a manufacturing line. The method including: selecting a set of sequential operations required to manufacture the lots; partitioning the product lots into designated lots and non-designated lots; and generating a release schedule for each of the non-designated lots into one or more operations of the set of sequential operations; generating a release schedule for each of the designated lots into each operation of set of sequential operations such that for each designated lot a total amount of time measured from completion of a first operation of the set of sequential operations through start of a last operation of the set of sequential operations does not exceed a target amount of time for the designated lots.

23 Claims, 14 Drawing Sheets

U.S. PATENT DOCUMENTS

| | | | |
|---|---|---|---|
| 5,826,236 A * | 10/1998 | Narimatsu et al. | 705/8 |
| 5,841,677 A * | 11/1998 | Yang et al. | 702/176 |
| 5,862,055 A * | 1/1999 | Chen et al. | 700/121 |
| 5,993,041 A * | 11/1999 | Toba | 700/99 |
| 6,049,742 A | 4/2000 | Milne et al. | |
| 6,131,052 A * | 10/2000 | Ban et al. | 700/121 |
| 6,161,054 A * | 12/2000 | Rosenthal et al. | 700/121 |
| 6,202,037 B1 * | 3/2001 | Hattori et al. | 702/182 |
| 6,317,725 B1 * | 11/2001 | Muraoka | 705/28 |
| 6,434,443 B1 | 8/2002 | Lin | |
| 6,445,967 B1 | 9/2002 | Travagline et al. | |
| 6,725,114 B1 * | 4/2004 | Jevtic | 700/100 |
| 6,766,208 B2 * | 7/2004 | Hsieh | 700/109 |
| 6,790,686 B1 * | 9/2004 | Purdy et al. | 438/14 |
| 6,823,287 B2 * | 11/2004 | Shafer et al. | 702/183 |
| 6,845,280 B1 | 1/2005 | Rives et al. | |
| 6,865,433 B1 * | 3/2005 | Burda | 700/101 |
| 6,910,947 B2 * | 6/2005 | Paik | 451/21 |
| 6,913,938 B2 * | 7/2005 | Shanmugasundram et al. | 438/16 |
| 6,950,716 B2 * | 9/2005 | Ward et al. | 700/121 |
| 6,961,626 B1 * | 11/2005 | Paik | 700/31 |
| 6,984,198 B2 * | 1/2006 | Krishnamurthy et al. | 438/14 |
| 6,999,836 B2 * | 2/2006 | Schwarm et al. | 700/121 |
| 6,999,848 B2 * | 2/2006 | Helwig | 700/213 |
| 7,040,956 B2 * | 5/2006 | Paik | 451/5 |
| 7,043,318 B1 * | 5/2006 | Barto et al. | 700/100 |
| 7,069,101 B1 * | 6/2006 | Arackaparambil et al. | 700/121 |
| 7,082,345 B2 * | 7/2006 | Shanmugasundram et al. | 700/121 |
| 7,096,085 B2 * | 8/2006 | Paik | 700/108 |
| 7,101,799 B2 * | 9/2006 | Paik | 438/692 |
| 7,113,840 B2 * | 9/2006 | Chen | 700/117 |
| 7,127,310 B1 | 10/2006 | Barto et al. | |
| 7,133,735 B2 * | 11/2006 | Kuo et al. | 700/103 |
| 7,160,739 B2 * | 1/2007 | Shanmugasundram et al. | 438/14 |
| 7,174,230 B2 * | 2/2007 | Arackaparambil et al. | 700/96 |
| 7,188,142 B2 * | 3/2007 | Chi et al. | 709/206 |
| 7,201,936 B2 * | 4/2007 | Schwarm et al. | 427/8 |
| 7,205,228 B2 * | 4/2007 | Padhi et al. | 438/652 |
| 7,221,990 B2 * | 5/2007 | Paik | 700/109 |
| 7,225,047 B2 * | 5/2007 | Al-Bayati et al. | 700/121 |
| 7,239,930 B2 * | 7/2007 | Burda et al. | 700/100 |
| 7,272,459 B2 * | 9/2007 | Kokotov et al. | 700/97 |
| 7,302,304 B2 | 11/2007 | Chen et al. | |
| 7,333,871 B2 * | 2/2008 | Schwarm | 700/108 |
| 7,337,019 B2 * | 2/2008 | Reiss et al. | 700/21 |
| 7,349,753 B2 * | 3/2008 | Paik | 700/110 |
| 7,354,332 B2 * | 4/2008 | Surana et al. | 451/5 |
| 7,356,377 B2 * | 4/2008 | Schwarm | 700/108 |
| 7,457,681 B2 * | 11/2008 | Krishna et al. | 700/121 |
| 7,463,939 B1 * | 12/2008 | Mata et al. | 700/100 |
| 7,698,012 B2 * | 4/2010 | Shanmugasundram et al. | 700/110 |
| 7,715,941 B1 * | 5/2010 | Purdy | 700/169 |
| 7,720,559 B1 * | 5/2010 | Stewart | 700/121 |
| 7,725,208 B2 * | 5/2010 | Shanmugasundram et al. | 700/110 |
| 7,783,375 B2 * | 8/2010 | Shanmugasundram et al. | 700/121 |
| 7,844,359 B2 * | 11/2010 | Shin et al. | 700/121 |
| 7,966,087 B2 * | 6/2011 | Kokotov et al. | 700/97 |
| 2002/0103564 A1 * | 8/2002 | Fielden et al. | 700/121 |
| 2002/0198617 A1 * | 12/2002 | Baek et al. | 700/101 |
| 2003/0130756 A1 | 7/2003 | Baweja et al. | |
| 2003/0171972 A1 * | 9/2003 | Heskin | 705/9 |
| 2005/0096770 A1 | 5/2005 | Chua et al. | |
| 2005/0154625 A1 * | 7/2005 | Chua et al. | 705/7 |
| 2005/0261921 A1 | 11/2005 | Chien et al. | |
| 2007/0083281 A1 | 4/2007 | Chen et al. | |
| 2007/0276530 A1 | 11/2007 | Duffin et al. | |
| 2008/0140243 A1 * | 6/2008 | Denton et al. | 700/102 |

OTHER PUBLICATIONS

Notice of Allowance (Mail Date Sep. 5, 2008) for U.S. Appl. No. 10/908,420, filed May 11, 2005.

Fordyce, et al.; 1990, Logistics Management System (LMS), Integrating Decision Technologies for Dispatch Scheduling in Semiconductor Manufacturing; The Institute of Management Sciences, Interfaces 20, Jan. 1-Feb. 1990; pp. 43-64.

Fordyce, et al.; 1992, Logistics Management System (LMS): An Advanced Decision Support System for the Fourth Decision Tier Dispatch or Short-Interval Scheduling; Production and Operations Management Society, vol. 1, No. 1, Winter 1992; pp. 70-86.

* cited by examiner

METHOD OF RELEASE AND PRODUCT FLOW MANAGEMENT FOR A MANUFACTURING FACILITY

This application is a continuation of U.S. patent application Ser. No. 10/908,420 filed on May 11, 2005, now U.S. Pat. No. 7,477,958, issued Jan. 13, 2009.

FIELD OF THE INVENTION

The present invention relates to the field of manufacturing facility control such as used in a semiconductor manufacturing facility; more specifically, it relates to a method and system for release to and product flow management of product in a manufacturing facility.

BACKGROUND OF THE INVENTION

Manufacturers, such as but not limited to semiconductor manufacturers, continually strive to increase yield and reduce cycle time in order to operate at the lowest possible cost. Conventional product release and product flow management methods address only logistic concerns such as cycle time and delivery schedule control. The problem of yield enhancement has been left to either improvements in tooling or establishment of simple process window/rework time windows. The ability to influence yield has otherwise been left un-addressed by product release and product flow management methods.

Therefore, there is a need for a method of release and product flow management for a manufacturing facility that allows for improved yield as well as cycle time and delivery schedule control.

SUMMARY OF THE INVENTION

A first aspect of the present invention is a method for scheduling lots of product through operations in a manufacturing line, comprising: selecting a sequential subset of a set of sequential operations required to manufacture the lots; partitioning the lots of product into designated lots and non-designated lots; and generating a release schedule for each of the non-designated lots into one or more operations of the sequential subset of the set of sequential operations; generating a release schedule for each of the designated lots into each operation of the sequential subset of the set of sequential operations such that for each designated lot a total amount of time measured from completion of a first operation of the sequential subset of the set of sequential operations through start of a last operation of the sequential subset of the set of sequential operations does not exceed a target amount of time for the designated lots.

A second aspect of the present invention is a computer program product, comprising a computer usable medium having a computer readable program code embodied therein, the computer readable program code comprising an algorithm adapted to implement a method for scheduling lots of product through operations in a manufacturing line, the method comprising the steps of: selecting a sequential subset of a set of sequential operations required to manufacture the lots; partitioning the lots of product into designated lots and non-designated lots; generating a release schedule for each of the non-designated lots into one or more operations of the sequential subset of the set of sequential operations; and generating a release schedule for each of the designated lots into each operation of the sequential subset of the set of sequential operations such that for each designated lot a total amount of time measured from completion of a first operation of the sequential subset of the set of sequential operations through start of a last operation of the sequential subset of the set of sequential operations does not exceed a target amount of time for the designated lots.

A third aspect of the present invention is a system for scheduling lots of product through operations in a manufacturing line, comprising: a zone of control creation module for initializing a zone of control database for a zone of control of a manufacturing line, the zone of control comprising a sequential subset of a set of sequential operations required to manufacture the lots, the lots of product partitioned into designated and non-designated lots; a zone of control release module for planning a release schedule for the designated lots of the lots into each operation of the zone of control to meet a total amount of time target, the total amount of time target measured from completion of a first operation of the zone of control through start of a last operation of zone of control; a zone of control monitor module for updating the release schedule of the designated lots and release schedules of the non-designated lots into each operation of the zone of control; and a what next module for selecting a next lot from the designated and the non-designated lots to release into each operation of the zone of control.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

In a semiconductor environment it was discovered that yields on certain products increase if several distinct but sequential operations were performed within a given amount of time. This sequence of operations is called a yield management zone of control (ZOC), hereinafter ZOC. The tools are designated ZOC tools and a ZOC product to be yield managed is run in ZOC lots of one or more pieces through the ZOC tools in sequence. This effect is different from the time window effect affecting two sequential process steps where the first step can be repeated if a time limit expires. Though applicable to other conditions, the present invention was developed to address the condition of sequential multiple operations, each operation requiring a different fabrication tool and where there may be multiple operations within a tool, where there may be multiple tools for any particular operation, where rework may not be possible and/or where non-ZOC lots (those lots whose yields do not change significantly as a function of their cycle time) may share one or more of the ZOC tools.

For the purposes of the present invention, a lot may comprise a single piece (for example, a single wafer in a semiconductor manufacturing line) or a group of two or more pieces (for example, two or more wafers in a wafer lot in a semiconductor manufacturing line) not withstanding the fact, that in some tools pieces of the same lot may be processed together and in some tools pieces of the same lot may be processed sequentially (e.g. single wafer vs. batch tools).

Figure 1:
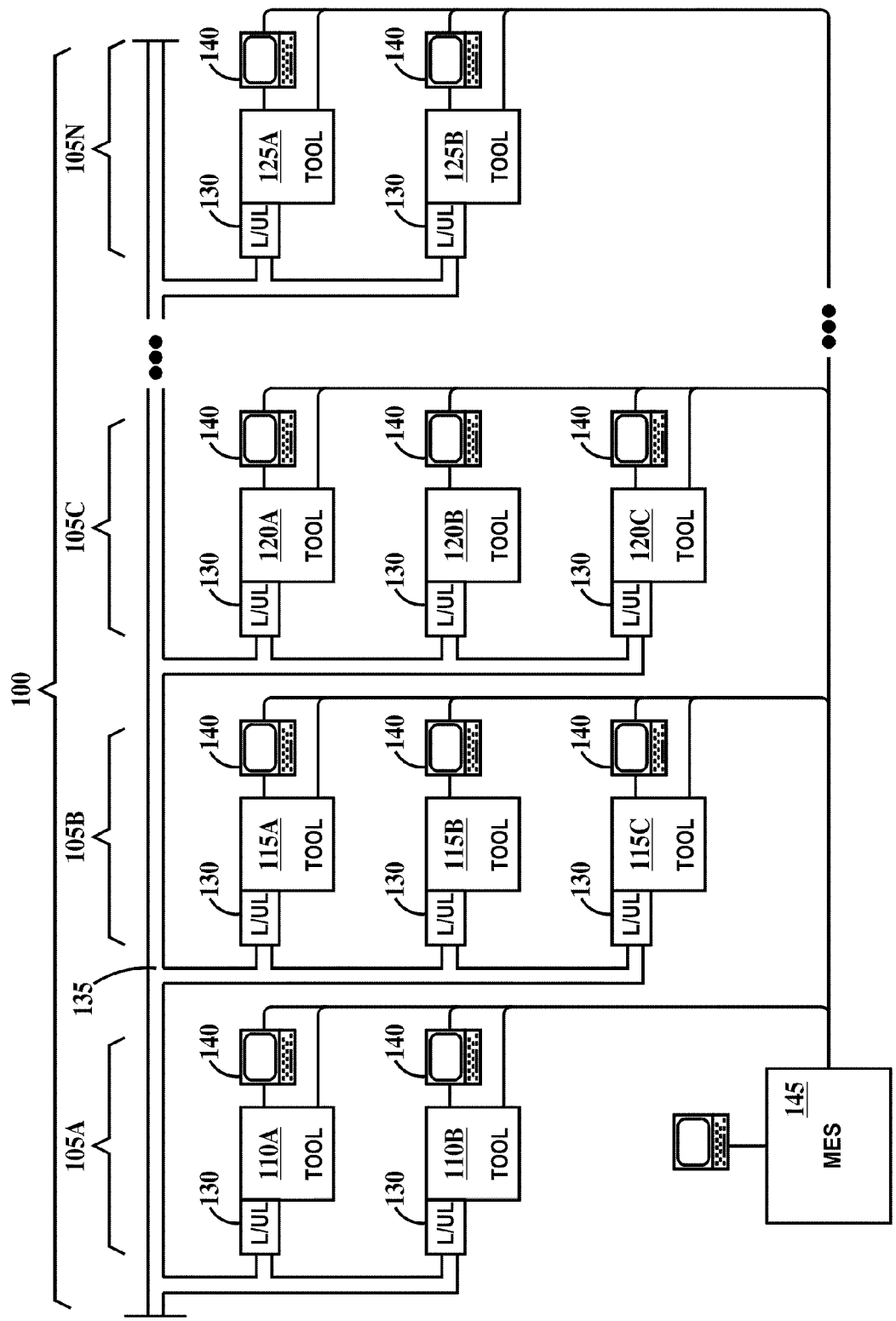
FIG. 1 a diagram of a portion of a manufacturing line according to the present invention.

FIG. 1 is a diagram of a portion of a manufacturing line according to the present invention. In FIG. 1 a ZOC 100 contains multiple ZOC operations (operations are also known as manufacturing activities) from a first ZOC operation 105A, a second ZOC operation 105B, a third ZOC operation 105C through a last ZOC operation 105N. ZOC operation 105A, 105B, 105C through 105N operations may be expresses as ZOC operation 1, ZOC operation 2, ZOC operation 3 . . . through ZOC operation N. For exemplary purposes, ZOC operation 105A includes process tools 110A and 110B, ZOC operation 105B includes process tools 115A, 115B and 115C, ZOC control 105C includes process tools 120A, 120B and 120C, and ZOC operation 105N includes process tools 125A and 125B. Process tools 110A and 110B can both perform the same process, so a ZOC lot can be run on either of ZOC tools 110A or 110B in ZOC operation 105A. Process tools 115A, 115B and 115C can all perform the same process, so a ZOC lot can be run on any of ZOC tools 115A, 115B or 115C in ZOC operation 105B. Process tools 120A, 120B and 120C can all perform the same process (or processes, i.e. are cluster tools), so a ZOC lot can be run on any of ZOC tools 120A, 120B or 120C in ZOC 105C. Process tools 125A and 125B can both perform the same process, so a ZOC lot can be run either of ZOC tools 125A or 125B in ZOC 105N. While specific numbers of process tools are illustrated in FIG. 1 for each ZOC operation, a given ZOC operation may include any number of ZOC tools from one up. Also, while all the ZOC operations are illustrated in proximity to one another, ZOC tools may be placed throughout a manufacturing line.

All ZOC tools 110A, 110B, 115A, 115B, 115C, 120A, 120B, 120C, 125A and 125C are illustrated as having load/unload (L/UL) stations 130 (which may include storage buffers) which are connected to an automated delivery system 135 and computer control/monitor stations 140 providing a link between ZOC tools and a manufacturing execution system (MES) 145. The general function of an MES function is to schedule, release and track product lots to and through the tools of a manufacturing line by issuing specific execution instructions (lot movement instructions) to a floor control system. The function of MES 145 in relation to ZOC 100 is to issue specific lot movement and tool assignment instructions to the floor control system if not completely generated by then at least logically based on input from WNMs 185A, 185B through 185N (see FIG. 2.

ZOC tools may be manual tools and not connected to delivery system 135 (e.g. human operators may move ZOC lots from ZOC tool to ZOC tool). ZOC tools need not be directly linked connected to MES 145 (e.g. human operators may receive and record ZOC lot/tool information from MES terminals distributed through a manufacturing line.

Figure 2:
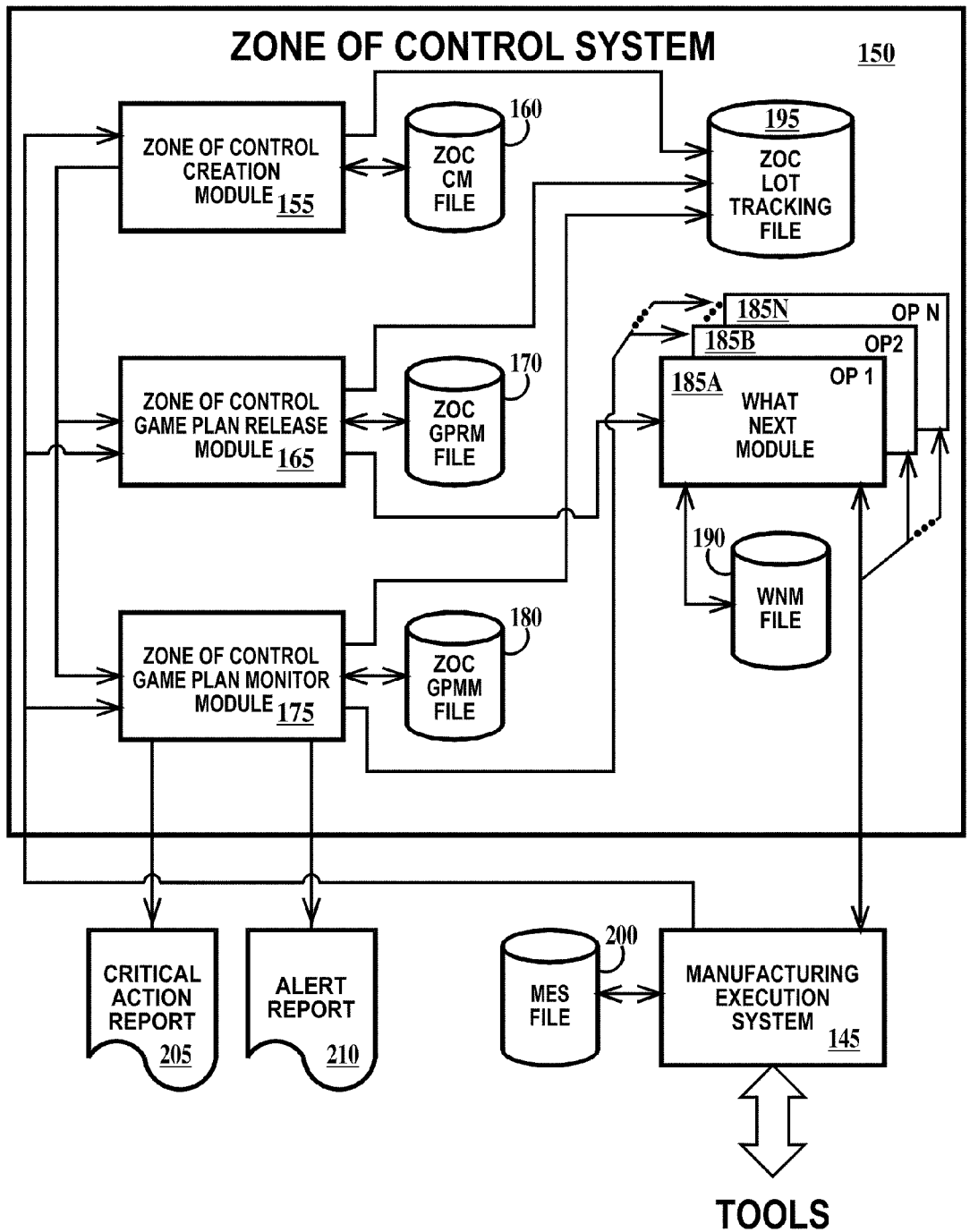
FIG. 2 is a system diagram of a zone of control system according to the present invention.

FIG. 2 is a system diagram of a zone of control system according to the present invention. In FIG. 2, a ZOC system 150 includes a ZOC creation module (ZOC CM) 155 and an associated ZOC CM file 160, a ZOC game plan release module (ZOC GPRM) 165 and an associated ZOC GPRM file 170, a ZOC game plan monitor module (ZOC GPMM) 175 and an associated ZOC GPMM file 180, and a set of what next modules (WNM) 185A, 185B through 185N (for corresponding ZOC operations, 1, 2 through N) and a corresponding WNM file (190). ZOC system 150 further includes a ZOC lot tracking file 195. ZOC CM 155, ZOC GPRM 165 and ZOC GPMM 175 all generate output that is stored in and/or can be retrieved from ZOC lot tracking file 195. It should be noted that the file system comprising ZOC CM file 160, ZOC GPRM file 170, ZOC GPMM file 180, WNM file 190 and ZOC lot tracking file 195 may be replaced by other file systems or data storage systems as known in the art. ZOC CM 155 can issue instructions and/or send data to ZOC GPRM 165, ZOC GPRM 165 can issues instructions and/or send data to ZOC WNM 185A (first ZOC operation) and ZOC GPMM 175 can issues instructions and/or send data to ZOC WNMs 185B through 185N. MES 145 (see FIG. 1) and associated MES file 200 are not part of ZOC system 150 but MES 145 can issue instructions to and/or send data to ZOC CM 155, ZOC GPRM 165 and ZOC GPRM 175 and can issue instructions to and/or send data to and/or receive data from WNM 185A, 185B through 185N. ZOC GPMM 175 can issue a critical action report 205 and an alert report 210 as required.

Briefly, ZOC CM 155 creates a file that defines a ZOC that MES 145 may utilize to schedule and route ZOC and non-ZOC lots through ZOC system 150. ZOC GPRM 165 generates a release schedule/tool assignment to the first of ZOC operation 105A of ZOC 100 (see FIG. 1) that will meet the yield window time restraint of the ZOC. ZOC GPMM 175 generates and updates ZOC lot priorities for the second through nth last operation of respective ZOC operations 105B, 105C through 105N of ZOC 100 (see FIG. 1) that will meet the yield window time restraint of the ZOC. WNM 185A, 185B through 185N identify ZOC and non-ZOC lots for the tools of their respective ZOC operations, prioritize the ZOC and non-ZOC lots according to pre-defined rules, and assign the ZOC and non-ZOC lots according to predefined algorithms. WNM 185A, 185B through 185N operate in real time.

ZOC system 150 generates, track and modifies ZOC lot schedules in the ZOC so ZOC lots start and finish through ZOC operations within a target time window that prevents delay related yield degradation, taking into account that there may be several ZOC lots and several non-ZOC lots that will use the same tools and schedules for all lots must be met.

Figure 3A:
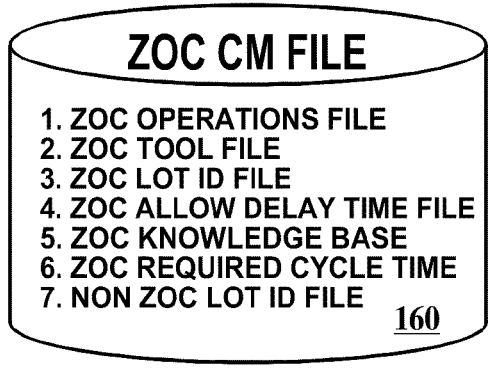
FIG. 3A through 3E illustrate the file structure of a the zone of control system of FIG. 2.

FIG. 3A through 3E illustrate the file structure of the zone of control system of FIG. 2. In FIG. 3A, ZOC CM file 160 includes a ZOC operations file, a ZOC tool file, a ZOC lot ID file, a ZOC allowable delay time file, a ZOC knowledge base file, a ZOC required cycle time file and a non-ZOC lot ID file. The ZOC operations file lists the manufacturing operations for the ZOC. The ZOC tool file lists tools that perform the operations of the ZOC. The ZOC lot ID file list the lots that are to be processed as part of the ZOC. The ZOC allowable delay time file gives maximum delay times between operations in the ZOC. The ZOC knowledge base file includes specific processing related schedule information, for example, for how many pieces could mask cleaning be delayed if a ZOC required a masking operation using a mask scheduled for cleaning. The ZOC required cycle time file gives the maximum delay between the first and last operation of the ZOC. The non-ZOC lot ID file lists non-ZOC lots that will be run on the ZOC tools.

Figure 3B:
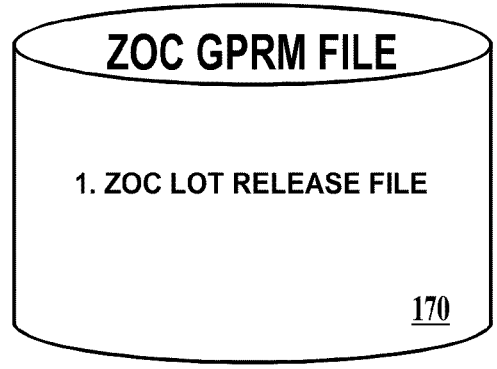

In FIG. 3B, ZOC GPRM file 180 includes a ZOC lot release file, which lists the ZOC earliest lot release date/time into the first operation of the ZOC. GPRM file 170 contains data pertinent to the first ZOC operation.

Figure 3C:

In FIG. 3C, ZOC GPMM file 170 include a ZOC lot priority file, a ZOC lot alert file, a ZOC lot critical list file, a recover options file, and a non-ZOC lot priority file. GPMM file 170 contains data pertinent to the second through last ZOC operations. The ZOC lot priority file lists the current relative priorities of ZOC lots. The ZOC lot alert file lists ZOC lots that have scheduling problems jeopardizing the ZOC time window. The ZOC lot critical list file lists ZOC lots which require recovery actions be taken in order to meet the ZOC time window. The recover options file contains potential actions that may be selected to recover a ZOC lot on the critical list to the ZOC time window. The non-ZOC lot priority file lists the current relative priorities of non-ZOC lots. Several ZOC lots and non-ZOC lots may share the same priority or ZOC lots and non-ZOC lots may be ranked in priority in a single list depending upon the type of MES used.

Figure 3D:
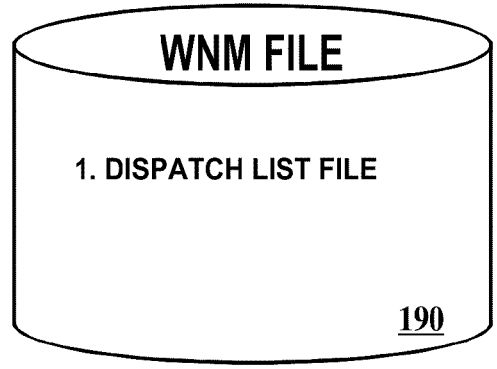

In FIG. 3D, WNM file 190 includes a dispatch list file which lists which of the ZOC and non-ZOC lots each ZOC operation are to be processed next and on which ZOC tool.

Figure 3E:
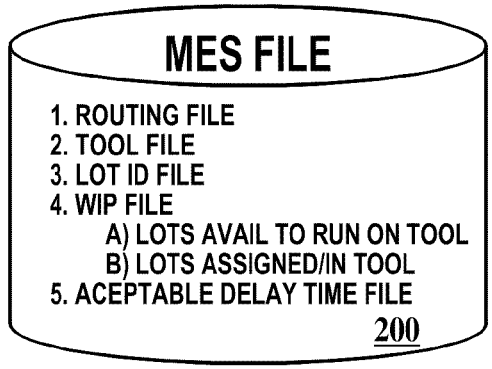

In FIG. 3E, MES file 200 includes a routing file, a tool file, a work in progress (WIP) file and an acceptable delay file. The routing file lists all the operations each lot must be processed through in the entire manufacturing line. The tool file lists the tools and status available for each operation in the manufacturing line. The WIP file lists the present status of all lots in the manufacturing line in two categories, those lots available to run on each tool in each operation, and those lots either assigned to or already in each tool (or tool buffer) in each operation. The acceptable delay file lists the time windows that cannot be exceeded between two sequential operations (this is not the ZOC time window which is for the entire set of ZOC operations).

Figure 4:
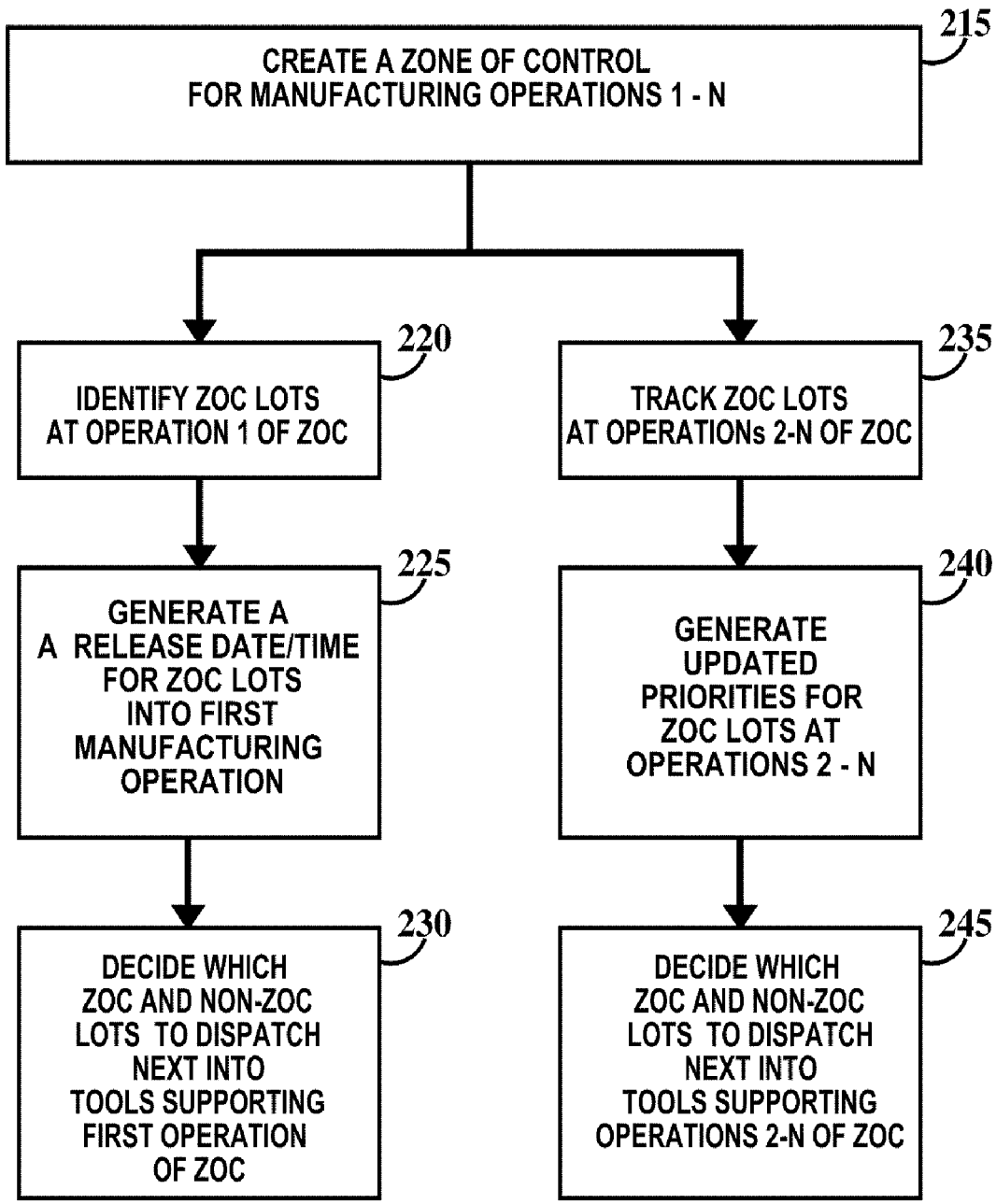
FIG. 4 is a flowchart of a method of release and product flow management according to the present invention.
Figure 5:
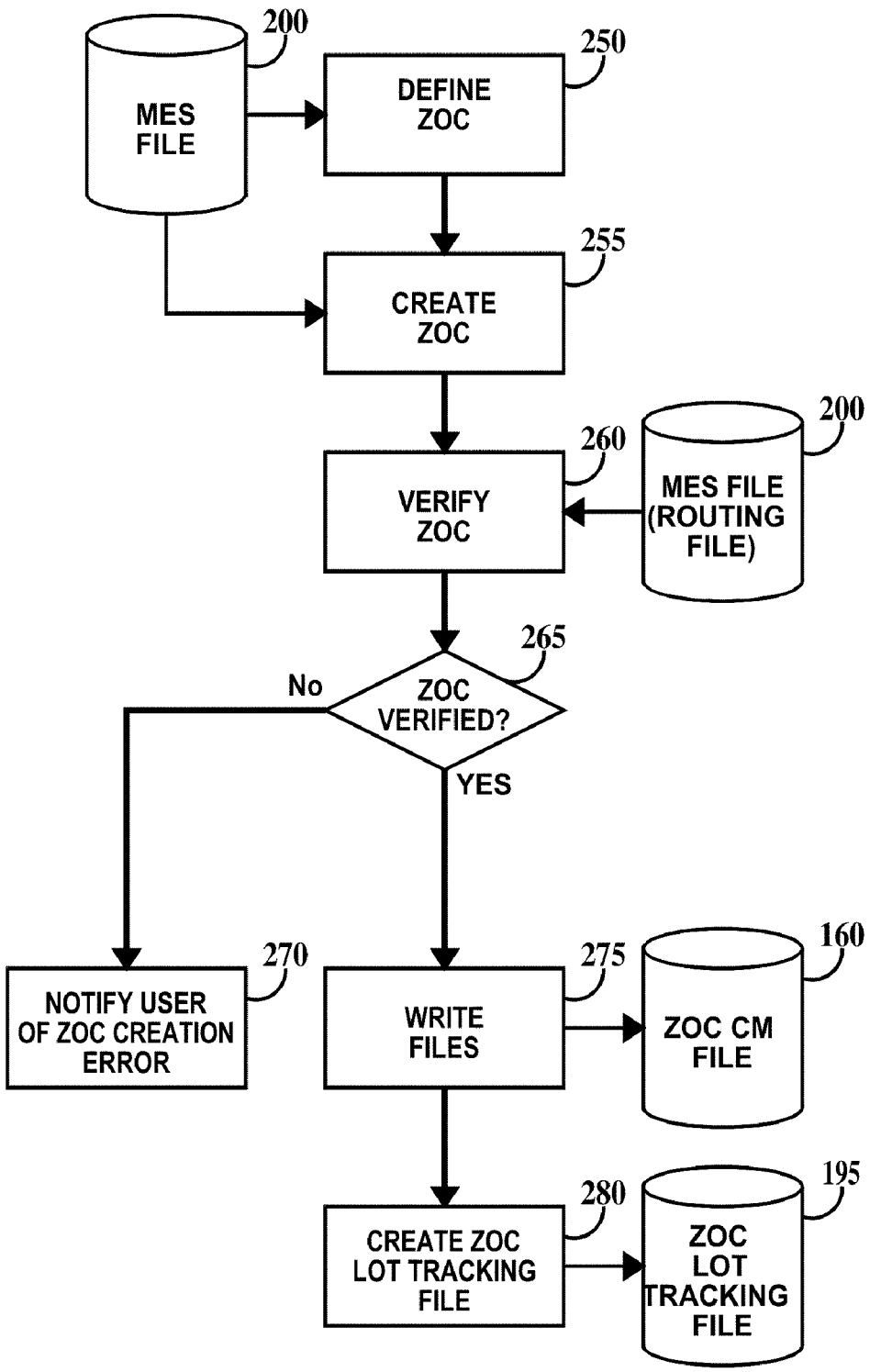
FIG. 5 is a flowchart of step 215 of FIG. 4.
Figure 6:
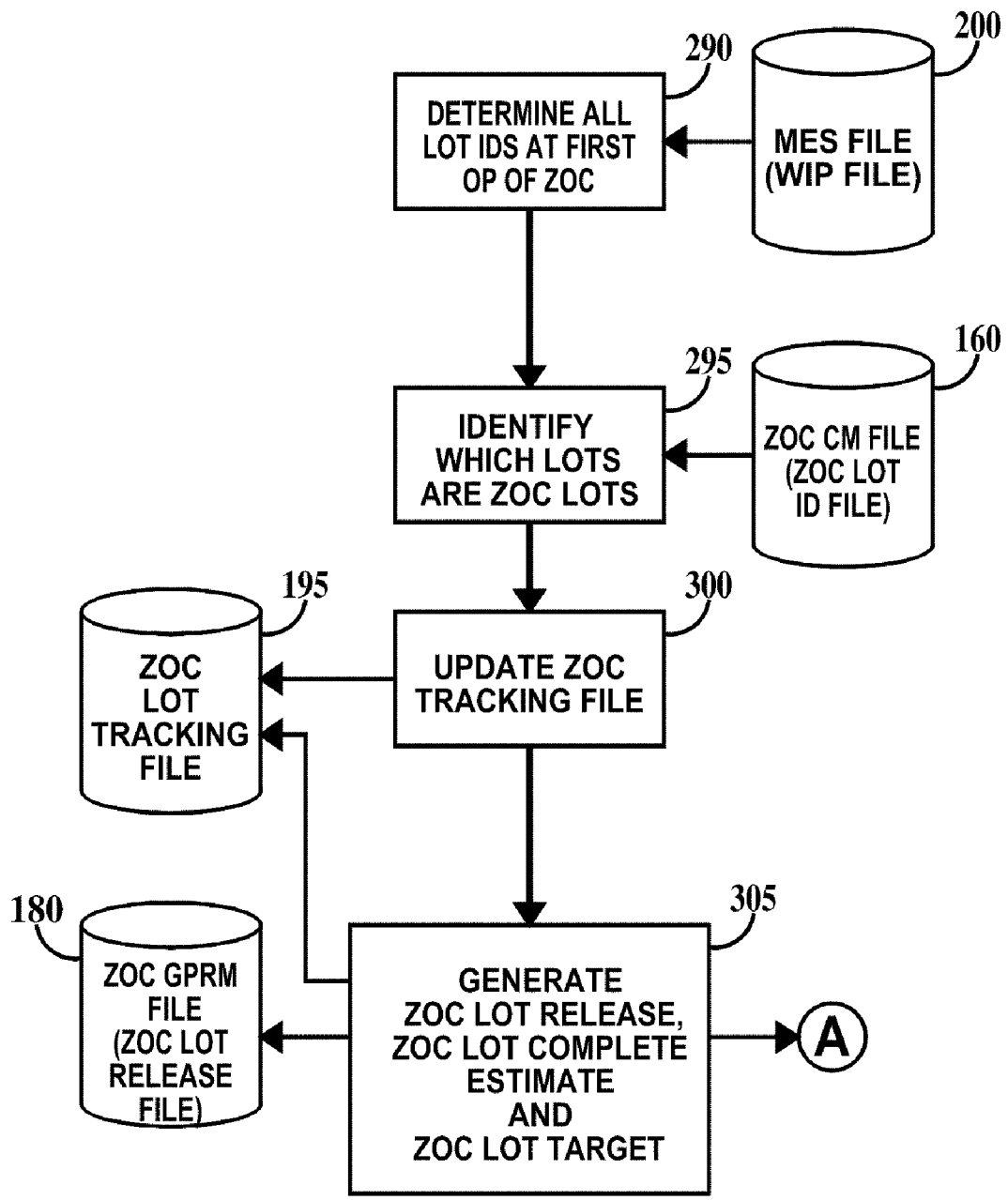
FIG. 6 is a flowchart of steps 220 and 225 of FIG. 4.

FIG. 4 is a flowchart of a method of release and product flow management according to the present invention. In step 215, operations 1 through N (or last) are selected for inclusion in a ZOC of control and a ZOC control is created. Step 215 is illustrated in FIG. 5 and described in further detail infra. In step 220 all ZOC lots available for processing through the first operation of the ZOC are identified and in step 225, an earliest release date/time into the first ZOC operation is generated for all ZOC lots available for starting in the first ZOC operation. Potential release date/times into subsequent operations of the ZOC are generated by the process used to generate the release date/time into the first ZOC operation. Steps 220 and 225 are illustrated in FIG. 6 and described in further detail infra. In step 230, the specific ZOC and non-ZOC lots to dispatch next into the ZOC tools of the first ZOC operation are selected and dispatched though a MES.

Figure 10:
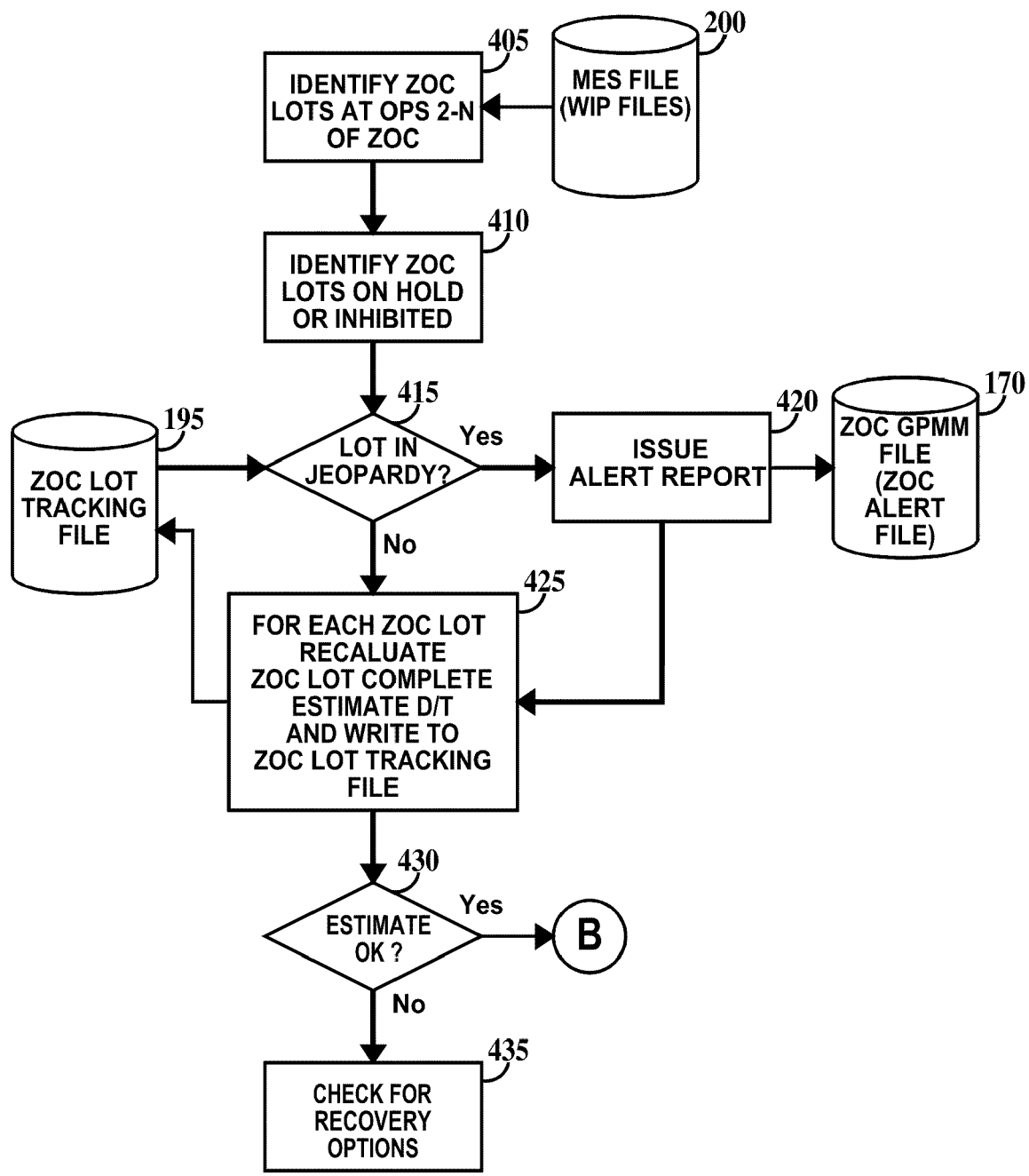
FIG. 10 is a flowchart of steps 235 and 240 of FIG. 4.

In step 235 all ZOC lots available for processing through each operation of the second through last operations of the ZOC are identified and in step 240, release date/times to the second through last ZOC operations is generated for all ZOC lots available for starting in each of the second through last ZOC operations. Steps 235 and 240 are illustrated in FIG. 10 and described in further detail infra. In step 245, the specific ZOC and non-ZOC lots to dispatch next into each ZOC tool of each of the second through last ZOC operation are selected and dispatched though a MES.

The process flow through steps 220, 225 and 230 occurs simultaneously with the process flow through steps 235, 240 and 245. There are two process flows because there are specific differences on how scheduling through the first operation of a ZOC is handled compared to how scheduling is handled in subsequent operations of the ZOC.

FIG. 5 is a flowchart of step 215 of FIG. 4. In step 250 a ZOC is defined using data from MES file 200. The ZOC of control is defined by the product type, first operation in the ZOC, the last operation in the ZOC and the maximum amount of time a lot of product this type is allowed to take from completing the first operation of the ZOC to entering the last operation of the ZOC. A ZOC control is a subset of sequential operations of the overall set of operations required to fabricate product of the product type.

In step 255, the ZOC is created using data from MES file 200. Information is selected from MES file 200 that will be incorporated in the file that controls the ZOC. This information includes each operation, the tools for each operation, the raw process times for each tool in the ZOC, the average aggregate raw process time to complete all the operation in the ZOC and all lot types that need to be run through each tool of the ZOC. Creating a ZOC is essentially creation of a routing file. In step 260, the ZOC is verified. Essentially, the ZOC routing file is compared to a subset of the overall routing file, the routing file of MES file 200. If in step 265, the ZOC does not verify then in step 270, a human operator is notified that a ZOC creation error has occurred and the problem may be pointed out. If, in step 265, the ZOC does verify then in step 275, the various ZOC CM file are written to ZOC CM file 160 and in step 280, ZOC lot tracking file 195 is created. The ZOC tracking file will include ZOC lot target date/time and ZOC lot complete estimated date/time data.

Figure 7:
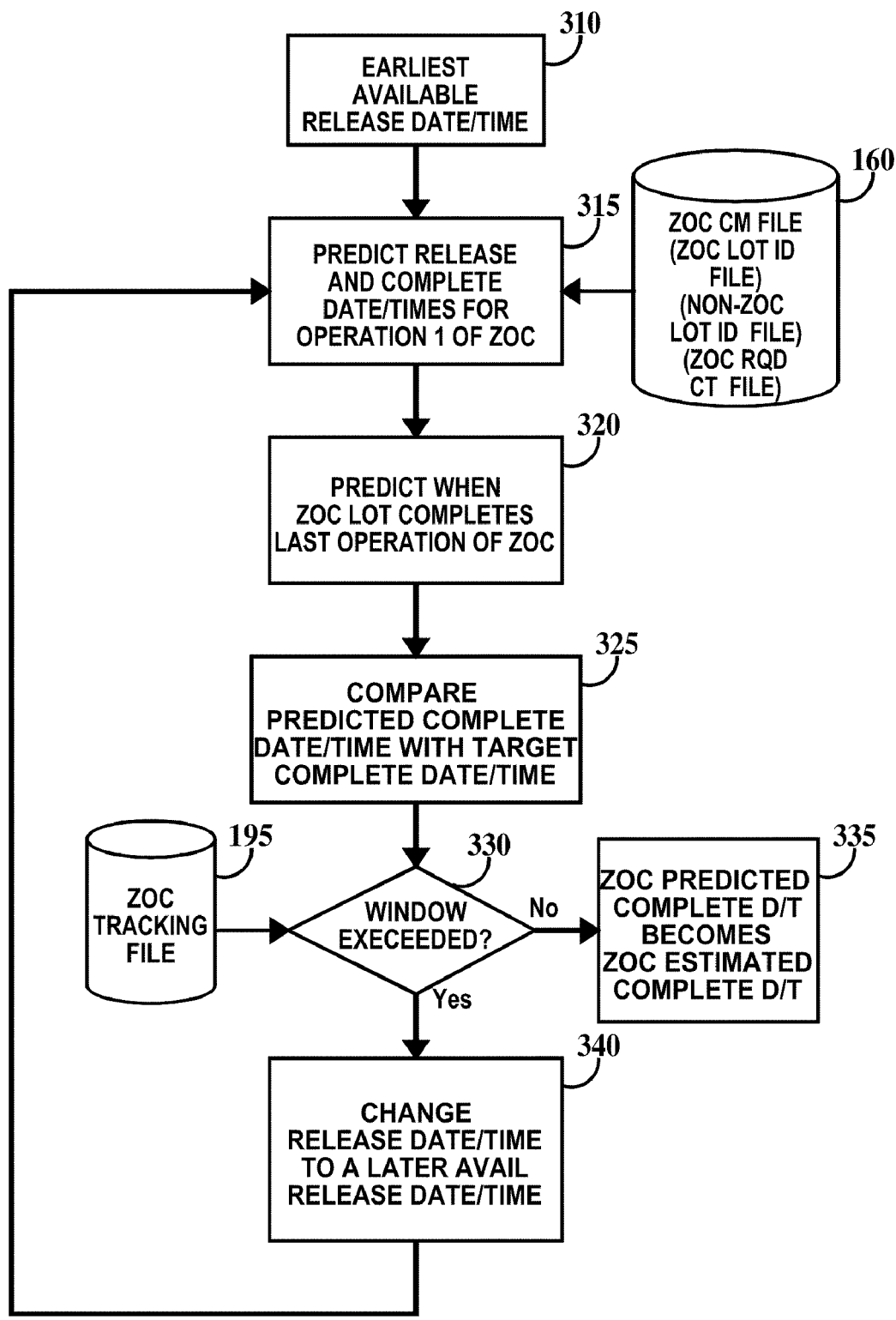
FIG. 7 is a flowchart of step 305 of FIG. 6.

FIG. 6 is a flowchart of steps 220 and 225 of FIG. 4. This sequence of steps is creating ZOC release date/times for ZOC lots into the first ZOC operation and estimated complete date/times. In step 290 using the WIP file of MES file 200, the lot IDs of all lots at the first ZOC operation are determined. In step 295, using the ZOC Lot ID it is determined which of the lot IDs are ZOC lot IDs and in step 300, the ZOC lot IDs are added to ZOC tracking file 195 and their information at the first ZOC operation. In step 305, ZOC lot release date/times are generated and written to the ZOC lot release file of ZOC GPRM file 170 and ZOC lot complete target date/times are generated and written to ZOC lot tracking file 195 based on the ZOC lot release date/times and the ZOC required cycle time file of ZOC CM file 160. At this point the ZOC lot complete target date/times are also the ZOC lot complete estimated date/times and the ZOC lot complete estimated date/times are written to ZOC tracking file 195. Step 305 is illustrated in FIG. 7 and described in further detail infra. From step 305, the method proceeds to connector A of FIG. 9.

Figure 8:
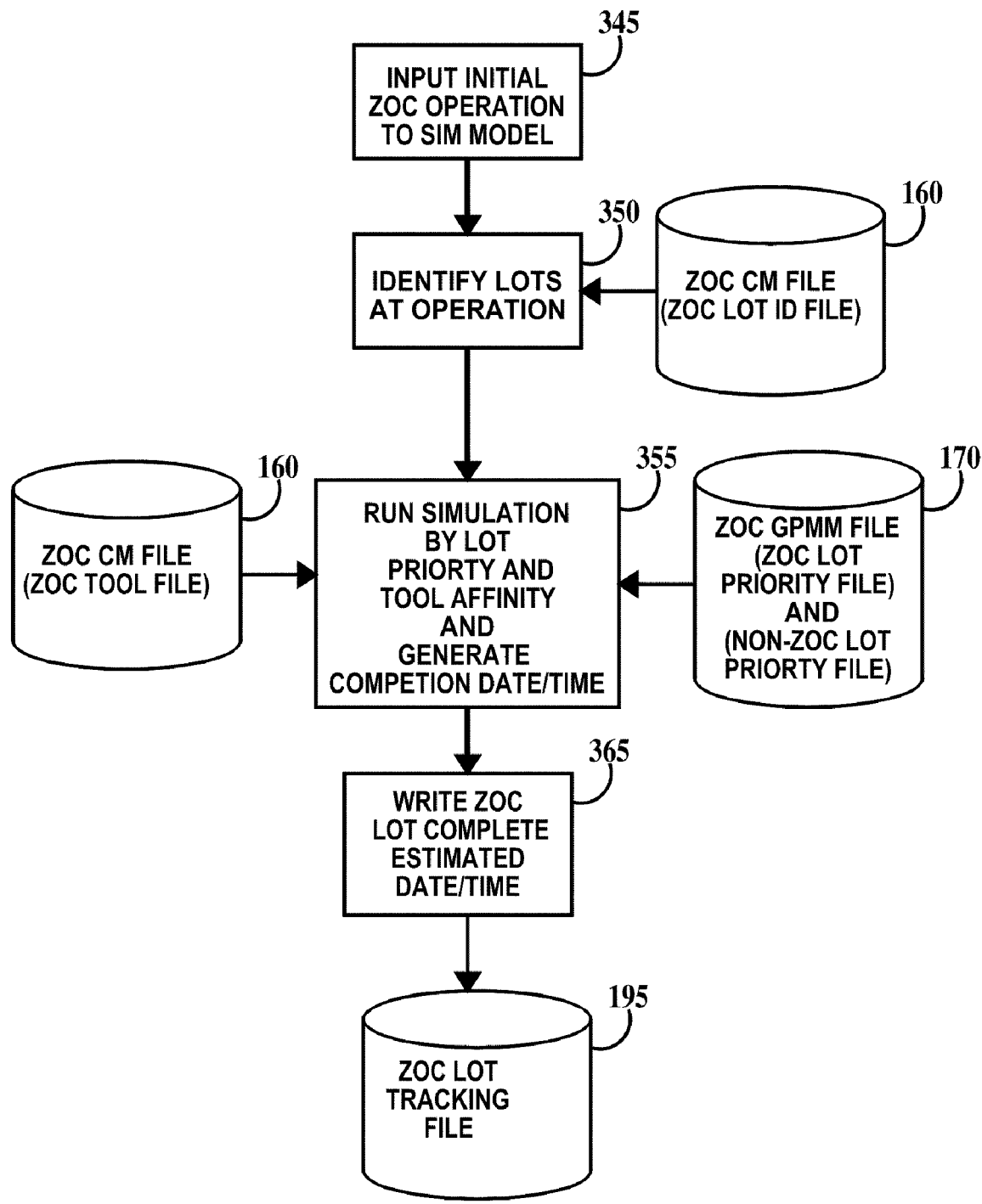
FIG. 8 is a flowchart of step 315 of FIG. 7 and step 445 of FIG. 11.

FIG. 7 is a flowchart of step 305 of FIG. 6. In step 310, the lot with the earliest available release date/time into the ZOC tool is selected. In step 315, ZOC lot predicted release and complete date/times for the first ZOC operation is generated using the earliest available release date/time and the ZOC lot ID file, the non-ZOC lot ID file and the ZOC required cycle time file of ZOC CM file 160. Step 315 is illustrated in FIG. 8 and described in further detail infra. In step 320, a ZOC complete predicted date/time through all the ZOC operations is generated using a simulation model of the ZOC. In a first example, the simulation model is a stochastic simulation model (e.g. utilizes probabilities of processing events happening to schedule). In a second example, a deterministic model is used. In a third example, an analytic model is used. In either the first or third examples, the ZOC lot complete estimated date/time may be maximum likelihood point estimated date/time or range of values with an associated predictive probability density function. In any of the three examples, an additional time may be optionally added to the nominally calculated ZOC lot complete date/time in order to buffer against cycle time uncertainties. In step 325, the ZOC lot complete predicted date/time is compared with the ZOC lot complete target date/time from ZOC tracking file 195. If in step 330, this window is not exceeded then in step 335 then the ZOC lot complete predicted date/time will be become the ZOC lot complete estimated date/time described supra and used in step 305 of FIG. 6. If in step 330, this window is exceeded, then in step 340, the ZOC release date/time is changed to a later date/time and the process loops back to step 315.

Figure 11:
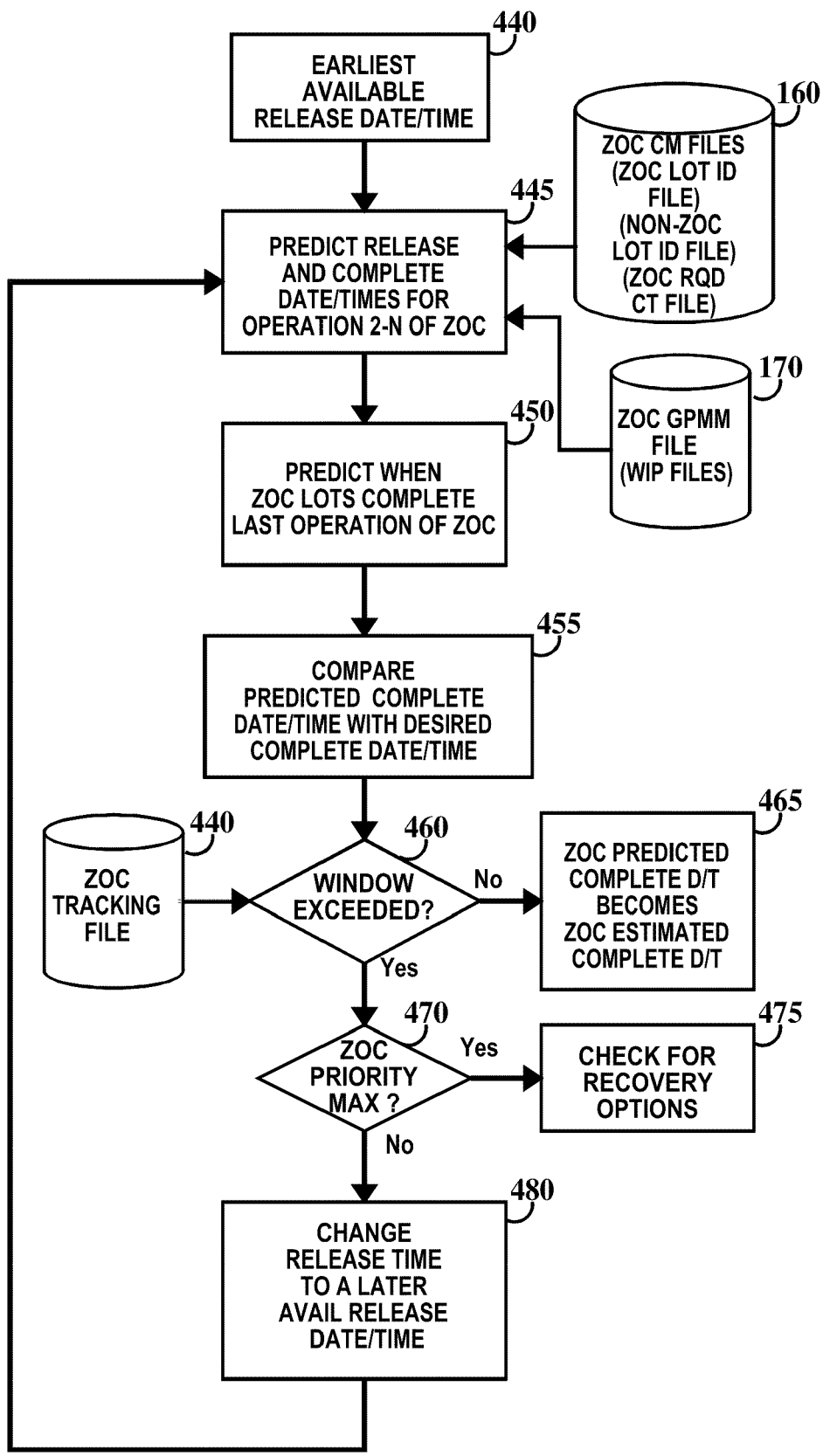
FIG. 11 is a flowchart of step 425 of FIG. 10.

FIG. 8 is a flowchart of step 315 of FIG. 7 and step 445 of FIG. 11. In step 345, the designated current ZOC operation is used to initialize the simulation model. In step 350, using the ZOC lot ID file of ZOC CM file 160, all ZOC lots at the current operation are identified. In step 355, using the ZOC lot priority file and the non-ZOC lot priority file of ZOC GPMM file 180 and using the ZOC tool file (having tool logistics data) of ZOC CM file 160 the simulation model is run to generate a ZOC lot complete prediction date/time for each lot at the designated ZOC operation. In step 365 the ZOC lot complete predicted date/time becomes the ZOC lot complete estimated date/time and is written to ZOC lot tracking file 195.

Figure 9:
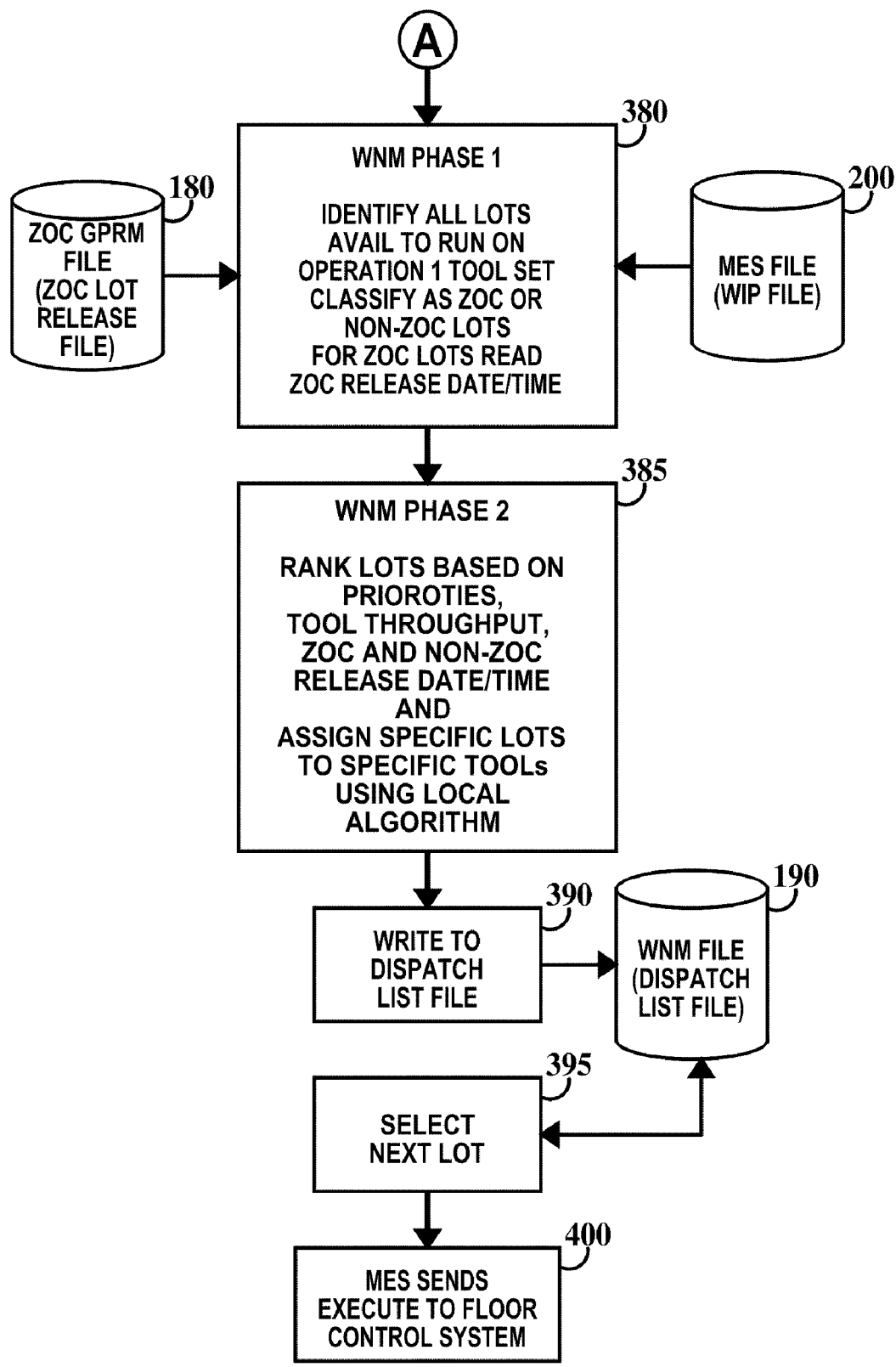
FIG. 9 is a flowchart of step 230 of FIG. 4.

FIG. 9 is a flowchart of step 230 of FIG. 4. This sequence of steps is deciding the order of ZOC and non-ZOC lots into the first operation of the ZOC. In step 380, using the ZOC lot release file from ZOC GPRM file 180 and the WIP files from MES file 200, all lots available to run on the first operation of the ZOC are identified and for ZOC lots the release date/time resultant from the simulation model is read. In step 385, all the lots, ZOC and non ZOC are ranked based lot priorities, tool throughputs in order to assign a tool and release date/time to the assigned tool based on local release algorithms. For example, if a lot has high priority but its earliest release time is not in the near future, the lot can be assigned a later release date/time that is no later than the release date/time from the simulation model. In step 390, the tool assignment and release date/time is written to the dispatch list file of WNM file 190. As steps 380 through 390 are being executed, steps 390 and 400 are also executed. In step 395, the next lot to release is selected from the dispatch list file of WNM file 190 and in step 400 the MES sends an execute instruction to the floor control system.

FIG. 10 is a flowchart of steps 235 and 240 of FIG. 4. This sequence of steps is creating release date/times for ZOC lots into the second through N (or last) ZOC operations. In step 405 using the WIP files of MES file 200 all the ZOC lots at each ZOC operation from the second through the last are identified. In step 410 ZOC lots identified by the MES as on hold or inhibited are identified (they are flagged in the WIP files of MES file 200). A lot may be identified as on hold or inhibited because the lots processing may not continue for some technical process reason (e.g. the lots must be inspected or lot data analyzed prior to the lot continuing to the next operation).

In step 415, it is determined if any ZOC lot is on hold or inhibited and is in jeopardy of not meeting its ZOC lot complete target date/time by comparing the ZOC lot's complete estimate to its corresponding ZOC lot complete target date/time. For all ZOC lots found to be in jeopardy, an alert report is issued in step 420 and written to the ZOC alert file of ZOC GPMM file 180. Alert reports may or may not generate actions by a human operator. The method then proceeds to step 425. For all ZOC lots found not to be in jeopardy the method immediately proceeds to step 425. In step 425, the estimated ZOC lot complete estimate is written to ZOC lot tracking file 195. The operations of step 425 are similar to the operations performed in FIG. 7 and described supra for the first operation of the ZOC, but are modified to account for effects only applicable to second through last ZOC operations. Step 425 is illustrated in FIG. 11 and described in further detail infra. Next, in step 430, it is determined if the recalculated ZOC lot complete estimated date/times for each ZOC lot meets its corresponding ZOC lot complete target date/time. If the ZOC lot complete estimated date/time meets its corresponding ZOC lot complete target date/time then the method proceeds to connector B of FIG. 13, otherwise the method proceeds to step 435 where a check for recovery actions is performed. Step 435 is illustrated in FIG. 12 and described in further detail infra.

FIG. 11 is a flowchart of step 425 of FIG. 10. In step 440, the lot with the earliest available release date/time into current operation under analysis is selected. In step 445, ZOC lot predicted release and complete date/times for the current ZOC operation is generated using the earliest available release date/time and the ZOC lot ID file, the non-ZOC lot ID file and the ZOC required cycle time file of ZOC CM file 160. Step 445 is illustrated in FIG. 8 and was described in detail supra. In step 450, a ZOC complete predicted date/time through all the ZOC operations is generated using the simulation model of the ZOC. In step 455, the ZOC lot complete predicted date/time is compared with the ZOC lot complete target date/time from ZOC tracking file 195. If in step 460, this window is not exceeded then in step 465 the ZOC lot complete predicted date/time will be become the ZOC lot complete estimated date/time described supra and used in step 425 of FIG. 10. If in step 460, this window is exceeded, then in step 470 it is determined if the ZOC lot is at a maximum priority. If the ZOC lot is at a maximum priority the method proceeds to step 475, otherwise the method proceeds to step 480. In step 475, a check for recovery options is performed. Step 480 is illustrated in FIG. 12 and described in detail infra. In step 480, the ZOC release date/time is changed to a later date/time and the process loops back to step 445.

Figure 12:
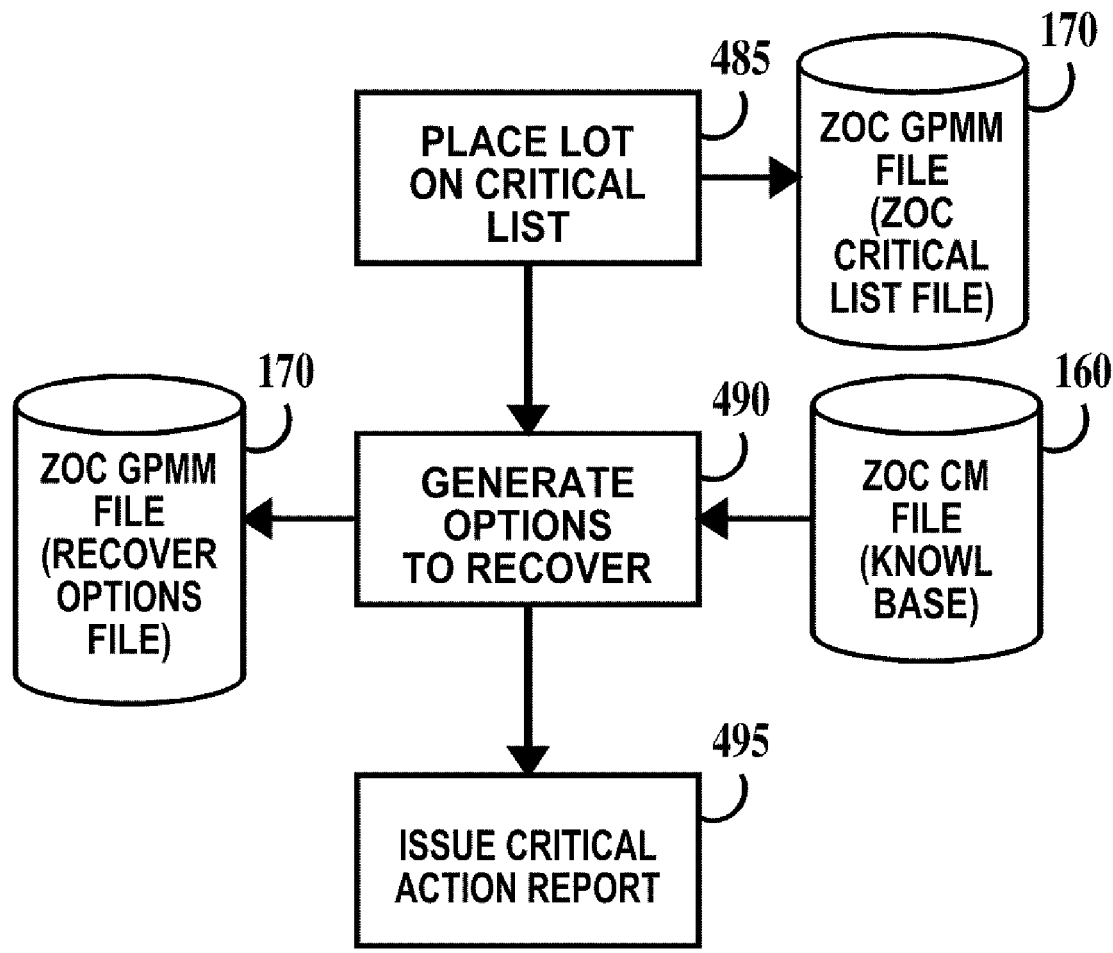
FIG. 12 is a flowchart of steps 435 of FIGS. 10 and 480 of FIG. 11.

FIG. 12 is a flowchart of steps 435 of FIGS. 10 and 480 of FIG. 11. In step 485, the ZOC lot is placed on the ZOC critical list and recorded in the ZOC critical list file of ZOC GPMM file 180. In step 490, options to recover are selected based on information in the knowledge base file of ZOC CM file 160 by a human. Any options found are written to the recover options file of ZOC GPMM file 180. In step 495, a critical action report is issued. Critical actions generally require approval/action by a human operator.

Figure 13:
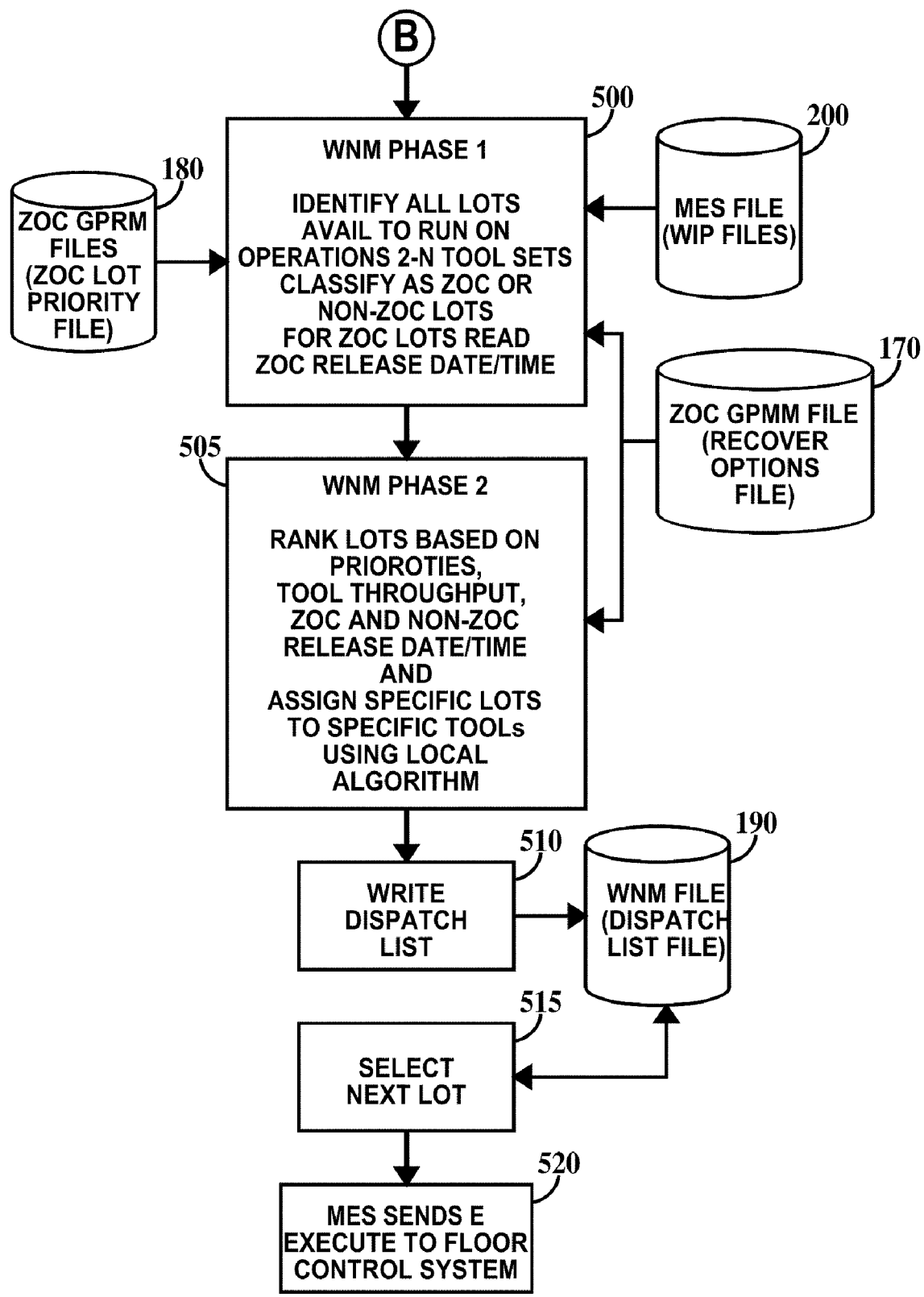
FIG. 13 is a flowchart of step 245 of FIG. 4.

FIG. 13 is a flowchart of step 245 of FIG. 4. This sequence of steps is deciding the order of ZOC and non-ZOC lots into the second through last operations of the ZOC. In the following steps, lots at a particular ZOC operations are processed as a groups, and steps are repeated for each ZOC operation starting from the second ZOC operation. So, in step 500, using the ZOC lot priority file from ZOC GPRM file 170, the WIP files from MES file 200 and the recover options file from ZOC GPMM file 180, all lots available to run on each of the second through last operations of the ZOC are identified and for ZOC lots the release date/time resultant from the simulation model is read. In step 505, all the lots, ZOC and non ZOC are ranked based lot priorities, tool throughputs in order to assign a tool and release date/time to the assigned tool based on local release algorithms. For example, if a lot has high priority but its earliest release time is not in the near future, the lot can is assigned a later release date/time that is no later than the release date/time from the simulation model. Other actions, for example, tool assignment and release to the tool date/time can be changed by a human operator in response to information in the recover options file of ZOC GPMM files 180. In step 510, the tool assignment and release date/time is written to the dispatch list file of WNM file 190. As steps 500 through 510 are being executed, steps 515 and 520 are also executed. In step 515, the next lot to release is selected from the dispatch list file of WNM file 190 and in step 520 the MES sends an execute instruction to the floor control system.

Figure 14:
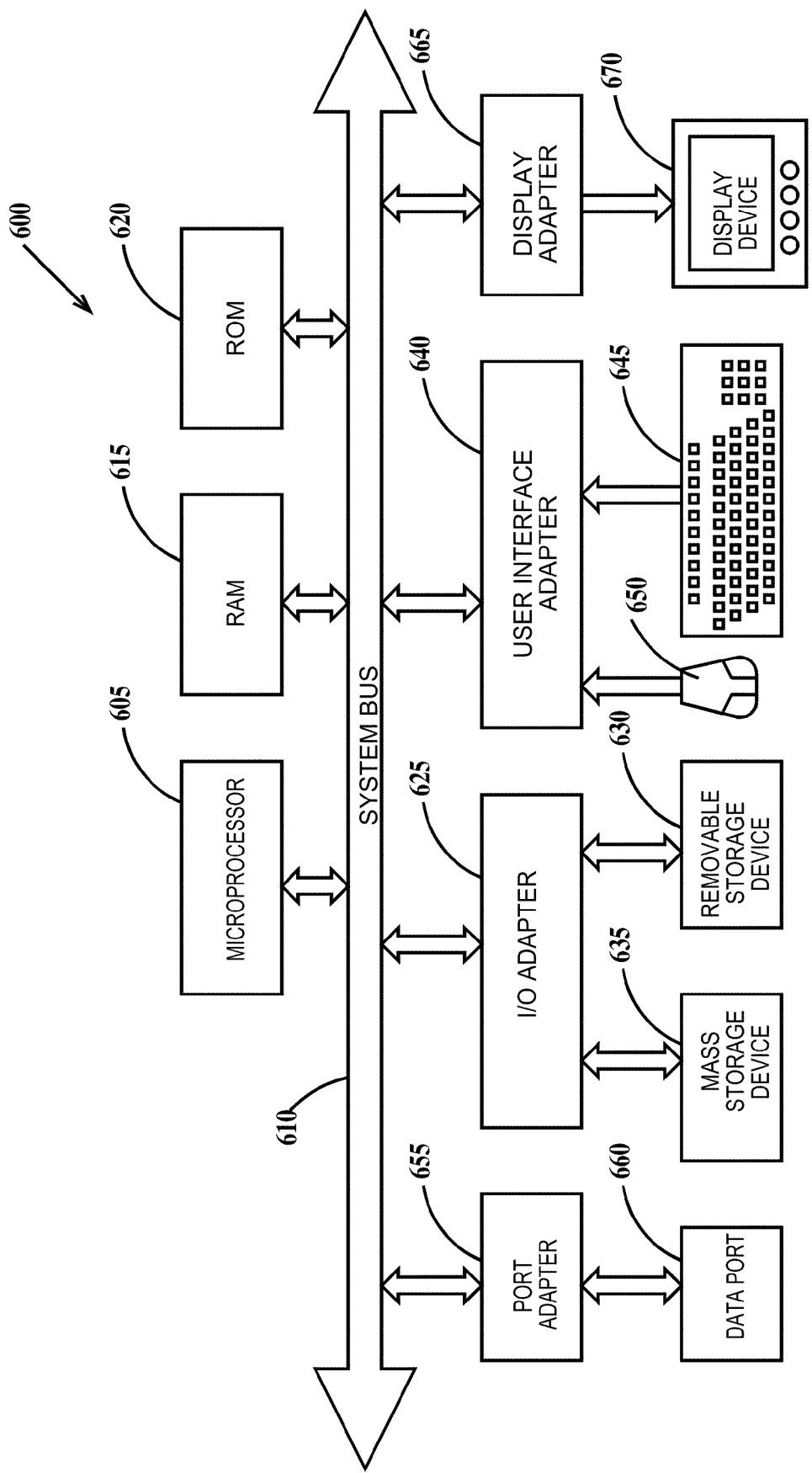
FIG. 14 is a schematic block diagram of a general-purpose computer for practicing the present invention.

Generally, the method described herein with respect to a method of release and product flow management is practiced with a general-purpose computer and the method may be coded as a set of instructions on removable or hard media for use by the general-purpose computer. FIG. 14 is a schematic block diagram of a general-purpose computer for practicing the present invention. In FIG. 14, computer system 600 has at least one microprocessor or central processing unit (CPU) 605. CPU 605 is interconnected via a system bus 610 to a random access memory (RAM) 615, a read-only memory (ROM) 620, an input/output (I/O) adapter 625 for a connecting a removable data and/or program storage device 630 and a mass data and/or program storage device 635, a human interface adapter 640 for connecting a keyboard 645 and a mouse 650, a port adapter 655 for connecting a data port 660 and a display adapter 665 for connecting a display device 670.

ROM 620 contains the basic operating system for computer system 600. The operating system may alternatively reside in RAM 615 or elsewhere as is known in the art. Examples of removable data and/or program storage device 630 include magnetic media such as floppy drives and tape drives and optical media such as CD ROM drives. Examples of mass data and/or program storage device 635 include hard disk drives and non-volatile memory such as flash memory. In addition to keyboard 645 and mouse 650, other human input devices such as trackballs, writing tablets, pressure pads, microphones, light pens and position-sensing screen displays may be connected to human interface 640. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 630, fed through data port 660 or typed in using keyboard 645.

Thus the present invention provides a method of release and product flow management for a manufacturing facility that allows for improved yield as well as cycle time and delivery schedule control.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:
   selecting a set of sequential operations, said set of sequential operations consisting two or more operations from a first operation to a last operation;
   partitioning lots of semiconductor product wafers into designated lots and non-designated lots, said designated lots containing product known to increase in yield if a target time through said set of sequential operations is not exceeded compared to designated lots that exceed said target time, said target amount of time measured from completion of said first operation to start of said last operation, said non-designated lots containing product known not to substantially decrease in yield if said target amount of time is exceeded or not exceeded;
   generating a release schedule for each of said non-designated lots into one or more operations of said set of sequential operations; and
   generating a release schedule for each of said designated lots into each operation of said set of sequential operations such that for each designated lot a total amount of time measured from completion of said first operation through a start of said last operation does not exceed said target amount of time, said target amount of time based on a yield target for said designated lots.

2. The method of claim 1, further including:
   generating a release schedule for each lot of said designated lots into said first operation of said set of sequential operations based on all existing release schedules of said designated and said non-designated lots into all operation of said set of sequential operations.

3. The method of claim 2, further including:
   modifying existing release schedules of said non-designated lots into said first operation of said set of sequential operations based on all existing release schedules of said designated and said non-designated lots into all operations of said set of sequential operations.

4. The method of claim 2, further including:
   simulating throughput of said set of sequential operations; and
   basing said release schedule of each lot of said designated lots into said first operation of said set of sequential operations based on said simulating.

5. The method of claim 1, further including:
   generating a release schedule for each lot of said designated lots into second through last operations of said set of sequential operations based on scheduling priorities of said designated and said non-designated lots into all operations of said set of sequential operations and based on all existing release schedules of said designated and said non-designated lots into all operations of said set of sequential operations.

6. The method of claim 5, further including:
   modifying existing release schedules of said non-designated lots into said second through last operations of said set of sequential operations based on all existing release schedules of said designated and said non-designated lots into all operations of said set of sequential operations.

7. The method of claim 5, further including:
   modifying existing release schedules of said designated lots into said second through last operations of said set of sequential operations based on all existing release schedules of said designated and said non-designated lots into all operations of said sequential subset of said set of sequential operations in order to generate a new release schedule for each lot of said designated lots into second through last operations of said set of sequential operations.

8. The method of claim 5, further including
   simulating throughput of said set of sequential operations; and
   basing said release schedule of each lot of said designated lots into said second through last operation of said set of sequential operations based on said simulating.

9. The method of claim 1, further including:
releasing said non-designated lots into operations of said set of sequential operations according to said release schedule for each of said non-designated lots; and
releasing said designated lots into operations of said set of sequential operations according to said release schedule for each of said designated lots.

10. The method of claim 1, wherein, for each lot of said designated lots, said generating said release scheduled includes:
(a) determining an earliest release date/time into a first operation of said set of sequential operations;
after (a), (b) determining a first predicted time through said set of sequential operations;
after (b), (c) comparing said first predicted time through said set of sequential operations to said target time;
after (c), (d) changing a scheduled release date/time into said first operation of said set of sequential operations from said earliest release date/time to a later release date/time if said first predicted time exceeds said target time;
after (d), (e) for second to last operations of said set of sequential operations determining a second predicted time through said second to last operations of said sequential subset of said set of sequential operations;
after (e), (f) comparing said second predicted time through said sequential subset of said set of sequential operations to said target time; and
after (f), (g) either increasing a priority of the lot of said designated lots or changing said scheduled release date/time if said second predicted time exceeds said target time.

11. A computer program product, comprising a non-transitory computer usable medium having a computer readable program code embodied therein, said computer readable program code comprising an algorithm adapted to implement a method for scheduling in a manufacturing line, said method comprising:
selecting a set of sequential operations, said set of sequential operations consisting two or more operations from a first to a last operation;
partitioning lots of semiconductor product wafers into designated lots and non-designated lots, said designated lots containing product known to increase in yield if a target time through said set of sequential operations is not exceeded compared to designated lots that exceed said target time, said target amount of time measured from completion of said first operation to start of said last operation, said non-designated lots containing product known not to substantially decrease in yield if said target amount of time is exceeded or not exceeded;
generating a release schedule for each of said non-designated lots into one or more operations of said set of sequential operations; and
generating a release schedule for each of said designated lots into each operation of said set of sequential operations such that for each designated lot a total amount of time measured from completion of said first operation through a start of said last operation does not exceed said target amount of time, said target amount of time based on a yield target for said designated lots.

12. The computer program product of claim 11, further including the method step of
generating a release schedule for each lot of said designated lots into said first operation of said set of sequential operations based on all existing release schedules of said designated and said non-designated lots into all operation of said set of sequential operations.

13. The computer program product of claim 12, further including the method step of:
modifying existing release schedules of said non-designated lots into said first operation of said set of sequential operations based on all existing release schedules of said designated and said non-designated lots into all operations of said set of sequential operations.

14. The computer program product of claim 12, further including the method steps of:
simulating throughput of said set of sequential operations; and
basing said release schedule of each lot of said designated lots into said first operation of said set of sequential operations based on said simulating.

15. The computer program product of claim 11, further including the method step of:
generating a release schedule for each lot of said designated lots into second through last operations of said set of sequential operations based on scheduling priorities of said designated and said non-designated lots into all operations of said set of sequential operations and based on all existing release schedules of said designated and said non-designated lots into all operations of said set of sequential operations.

16. The computer program product of claim 15, further including the method step of:
modifying existing release schedules of said non-designated lots into said second through last operations of said set of sequential operations based on all existing release schedules of said designated and said non-designated lots into all operations of said set of sequential operations.

17. The computer program product of claim 15, further including the method step of:
modifying existing release schedules of said designated lots into said second through last operations of said set of sequential operations based on all existing release schedules of said designated and said non-designated lots into all operations of said sequential subset of said set of sequential operations in order to generate a new release schedule for each lot of said designated lots into second through last operations of said set of sequential operations.

18. The computer program product of claim 15, further including the method step of:
simulating throughput of said set of sequential operations; and
basing said release schedule of each lot of said designated lots into said second through last operation of said set of sequential operations based on said simulating.

19. The computer program product of claim 11, further including the method steps of:
releasing said non-designated lots into operations of said set of sequential operations according to said release schedule for each of said non-designated lots; and
releasing said designated lots into operations of said set of sequential operations according to said release schedule for each of said designated lots.

20. The computer program product of claim 11, wherein, for each lot of said designated lots, said generating said release scheduled includes the method steps of:
(a) determining an earliest release date/time into a first operation of said set of sequential operations;
after (a), (b) determining a first predicted time through said set of sequential operations;
after (b), (c) comparing said first predicted time through said set of sequential operations to said target time;

after (c), (d) changing a scheduled release date/time into said first operation of said set of sequential operations from said earliest release date/time to a later release date/time if said first predicted time exceeds said target time;

after (d), (e) for second to last operations of said set of sequential operations determining a second predicted time through said second to last operations of said sequential subset of said set of sequential operations;

after (e), (f) comparing said second predicted time through said sequential subset of said set of sequential operations to said target time; and after (f), (g) either increasing a priority of the lot of said designated lots or changing said scheduled release date/time if said second predicted time exceeds said target time.

21. A system for scheduling in a manufacturing line, comprising:

a zone of control creation module for initializing a zone of control database for a zone of control of a manufacturing line, said zone of control comprising a set of sequential operations required to manufacture said product, said product partitioned into designated lots and non-designated lots of semiconductor wafers, said designated lots containing product known to increase in yield if a target time through said set of sequential operations is not exceeded compared to designated lots that exceed said target time, said target amount of time measured from completion of said first operation to start of said last operation, said non-designated lots containing product known not to substantially decrease in yield if said target amount of time is exceeded or not exceeded;

a zone of control release module for planning a release schedule for said designated lots of said lots into each operation of said zone of control to meet said target amount of time, said target amount of time measured from completion of a first operation of said zone of control through start of a last operation of zone of control, said target amount of time based on a yield target for said designated lots;

a zone of control monitor module for updating said release schedule of said designated lots and release schedules of said non-designated lots into each operation of said zone of control; and a what next module for selecting a next lot from said designated and said non-designated lots to release into each operation of said zone of control.

22. The system of claim 21, further including:

means for linking said zone of control creation module, said zone of control release module, said zone of control monitor module and said what next module to a manufacturing execution system; and means for linking said zone of control database to a manufacturing execution system database of said manufacturing execution system.

23. The system of claim 21, wherein said set of sequential operations are a subset of a larger set of sequential operations required to manufacture said designated and said non-designated lots.

* * * * *